US012405058B2

(12) United States Patent
Faulkner

(10) Patent No.: US 12,405,058 B2
(45) Date of Patent: Sep. 2, 2025

(54) CAN DRYING AND MOISTURE CONTROL SYSTEM

(71) Applicant: Stolle Machinery Company, LLC, Centennial, CO (US)

(72) Inventor: Christopher James Faulkner, Lancashire (GB)

(73) Assignee: Stolle Machinery Company, LLC, Centennial, CO (US)

( * ) Notice: Subject to any disclaimer, the term of this patent is extended or adjusted under 35 U.S.C. 154(b) by 618 days.

(21) Appl. No.: 17/819,719

(22) Filed: Aug. 15, 2022

(65) Prior Publication Data

US 2023/0051688 A1 Feb. 16, 2023

Related U.S. Application Data

(60) Provisional application No. 63/233,355, filed on Aug. 16, 2021.

(51) Int. Cl.

| | |
|---|---|
| ***F26B 21/08*** | (2006.01) |
| ***F26B 3/04*** | (2006.01) |
| ***F26B 15/18*** | (2006.01) |
| ***F26B 21/00*** | (2006.01) |

(52) U.S. Cl.

CPC .............. *F26B 21/086* (2013.01); *F26B 3/04* (2013.01); *F26B 15/18* (2013.01); *F26B 21/002* (2013.01)

(58) Field of Classification Search

CPC .......... F26B 21/086; F26B 3/04; F26B 15/18; F26B 21/002

USPC ............................................................ 34/474

See application file for complete search history.

(56) References Cited

U.S. PATENT DOCUMENTS

| | | | | |
|---|---|---|---|---|
| 3,050,297 A * | 8/1962 | Walter | F26B 15/04 | 432/51 |
| 3,157,390 A | 11/1964 | Douglas | | |
| 4,492,571 A * | 1/1985 | Miura | F27B 9/243 | 432/59 |

(Continued)

FOREIGN PATENT DOCUMENTS

| | | |
|---|---|---|
| CN | 103123215 | 5/2013 |
| CN | 207649305 | 7/2018 |

(Continued)

OTHER PUBLICATIONS

European Patent Office, EP Patent Appl. No. 22858984.2, Extended European Search Report, May 20, 2025, 10 pages.

(Continued)

*Primary Examiner* — Stephen M Gravini
(74) *Attorney, Agent, or Firm* — Eckert Seamans Cherin & Mellott, LLC

(57) ABSTRACT

A heating system for use with a can dryer or oven includes a gas burner, an electrical heating element, a heating chamber structured to heat cans using air heated by the gas burner and/or the electrical heating element, a circulation system structured to move air from the gas burner and the electrical heating element to the heating chamber, and a control system structured to selectively control the gas burner and the electrical heating element to switch between a first mode where the gas burner and the electrical heating element are active and both heat air provided to the heating chamber and in a second mode where the gas burner is inactive and the electrical heating element is active.

19 Claims, 2 Drawing Sheets

(56) References Cited

U.S. PATENT DOCUMENTS

| | | | | |
|---|---|---|---|---|
| 4,711,294 | A | 12/1987 | Jacobs et al. | |
| 4,808,782 | A | 2/1989 | Nakagawa et al. | |
| 5,271,164 | A | 12/1993 | Yoshimura et al. | |
| 5,528,839 | A * | 6/1996 | Seidl | F26B 13/104 34/364 |
| 5,651,192 | A * | 7/1997 | Horwitz | D06F 58/30 236/78 D |
| 5,750,174 | A | 5/1998 | Lucassen | |
| 6,085,443 | A * | 7/2000 | Hunter | F26B 21/06 34/174 |
| 6,497,737 | B1 | 12/2002 | Conochie et al. | |
| 7,461,509 | B2 * | 12/2008 | Mick | F01D 21/003 60/779 |
| 9,096,079 | B2 * | 8/2015 | Priebe | B41J 11/0022 |
| 10,590,594 | B2 * | 3/2020 | Berdut-Teruel | F26B 11/00 |
| 10,927,493 | B2 | 2/2021 | Sasaki et al. | |
| 11,958,646 | B2 * | 4/2024 | Lelie | F23D 14/16 |
| 12,060,828 | B1 * | 8/2024 | Grainger | F02C 6/04 |
| 2007/0256320 | A1 | 11/2007 | Pearson | |
| 2011/0302802 | A1 | 12/2011 | Wiseman et al. | |
| 2012/0145693 | A1 | 6/2012 | Deng | |
| 2018/0027091 | A1 | 1/2018 | Agarwal et al. | |
| 2018/0032514 | A1 | 2/2018 | Venkataraman et al. | |
| 2023/0051688 | A1 * | 2/2023 | Faulkner | F26B 23/02 |
| 2023/0055615 | A1 * | 2/2023 | Iglauer-Angrik | F26B 15/12 |
| 2024/0424548 | A1 * | 12/2024 | Reinhardt | F26B 3/04 |

FOREIGN PATENT DOCUMENTS

| | | | | |
|---|---|---|---|---|
| CN | 212 457 818 | U | 2/2021 | |
| CN | 117795277 | A * | 3/2024 | F23L 15/00 |
| DE | 102020201705 | A1 * | 8/2021 | F26B 15/12 |
| EP | 3491934 | A1 | 6/2019 | |
| GB | 622939 | A | 5/1949 | |
| JP | 07 32487 | U | 6/1995 | |
| JP | 2012 026711 | A | 2/2012 | |
| JP | 6466093 | | 2/2019 | |
| JP | 2024529720 | A * | 8/2024 | |
| KR | 100 921 653 | B1 | 10/2009 | |
| WO | 2014/166830 | | 10/2014 | |
| WO | WO-2021160218 | A2 * | 8/2021 | F26B 15/12 |
| WO | WO-2023022963 | A1 * | 2/2023 | F23L 15/00 |

OTHER PUBLICATIONS

U.S. Patent and Trademark Office, PCT Application No. PCT/US22/40297 International Search Report, Dec. 8, 2022, seven pages.

* cited by examiner

CAN DRYING AND MOISTURE CONTROL SYSTEM

CROSS REFERENCE TO RELATED APPLICATIONS

This application claims priority to U.S. Patent Application Ser. No. 63/233,355, filed Aug. 16, 2021, entitled, Can Drying and Moisture Control System.

FIELD OF THE INVENTION

The disclosed concept relates generally to can making, and more particularly to heating systems and method for can dryers or ovens.

BACKGROUND OF THE INVENTION

Metal beverage and food containers (e.g., cans) are mechanically formed using a system of formers and dies. To prevent damage to the products, oils are used to lubricate the surfaces during the forming processes. After the forming process, the oils and other contaminants are washed off the surfaces via a plurality of washing stages. The metal surfaces need to be thoroughly clean and dry before they are sprayed with lacquers and decorated with inks prior to being filled with the food and drink products.

The drying of cans following a typical multi-stage washer will be used as an example. A schematic diagram of a typical drying system is shown in FIG. 1. This process is very energy intensive and this dryer 15 works the hardest in the container making process.

The cans leave the washing process and are presented onto a continuous conveyor 5 that transports the cans through the drying process. The cans entering the dryer 15 have a residual water film that needs to be removed.

The drying process is designed to use high temperature hot air to evaporate the water film to zero before the cans leave the dryer.

Hot air is blown onto the cans via a plenum chamber 1 fitted with nozzles, via a recirculation centrifugal fan 2, and ducts. Natural gas 12 and combustion air 13 are fed into a direct fired gas burner 3 that burns natural gas 12 in a combustion chamber 4. The energy released heats the air flowing around the combustion chamber 4 to a desired operating temperature.

The energy in the hot air is used to raise the temperature of the incoming containers and evaporate the water off the metal surfaces. As the air gives up its thermal energy to the heating and vaporizing process, the air cools. The cooled air is drawn through the conveyor 5 and ducted past the combustion chamber 4 where it is reheated to the desired temperature. The reheated air is then fed into the suction side of a recirculation centrifugal fan 2, completing the recirculation cycle.

The recirculating hot air absorbs water that has vaporized and evaporated from the surface of the metal containers. The water vapor, absorbed into the air, is mixed with the products of the gas combustion.

A portion of the hot recirculating air is drawn off via a damper 6 and the exhaust centrifugal fan 7, which blows the air into an exhaust stack and discharges it to the outside of the building to the atmosphere 8.

Cool fresh air 14 from either inside or outside the building is drawn into the recirculating air stream via a damper 9 to balance the pressures inside the dryer 15. It is important to create a balanced pressure to prevent uncontrolled air infiltrating into the dryer cavity through the can inlet 10 and outlet ports 11, which causes instability. More importantly, balancing the pressures prevent fugitive hot air and contain combustion fumes escaping from the dryer cavity into the operating area where technicians will be working.

The typical drying process is energy intensive and wasteful. The is room for improvement in can drying systems.

SUMMARY OF THE INVENTION

In accordance with an aspect of the disclosed concept, a heating system for use with a can dryer or oven comprises: a gas burner; an electrical heating element; a heating chamber structured to heat cans using air heated by the gas burner and/or the electrical heating element; a circulation system structured to move air from the gas burner and the electrical heating element to the heating chamber; and a control system structured to selectively control the gas burner and the electrical heating element to switch between a first mode where the gas burner and the electrical heating element are active and both heat air provided to the heating chamber and in a second mode where the gas burner is inactive and the electrical heating element is active.

In accordance with another aspect of the disclosed concept, a method of heating cans in a can dryer or oven comprises: providing a gas burner, an electrical heating element, a heating chamber structured to heat cans using air heated by the gas burner and/or the electrical heating element, and a circulation system structured to move air from the gas burner and the electrical heating element to the heating chamber; and selectively controlling the gas burner and the electrical heating element to switch between a first mode where the gas burner and the electrical heating element are active and both heat air provided to the heating chamber and in a second mode where the gas burner is inactive and the electrical heating element is active.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
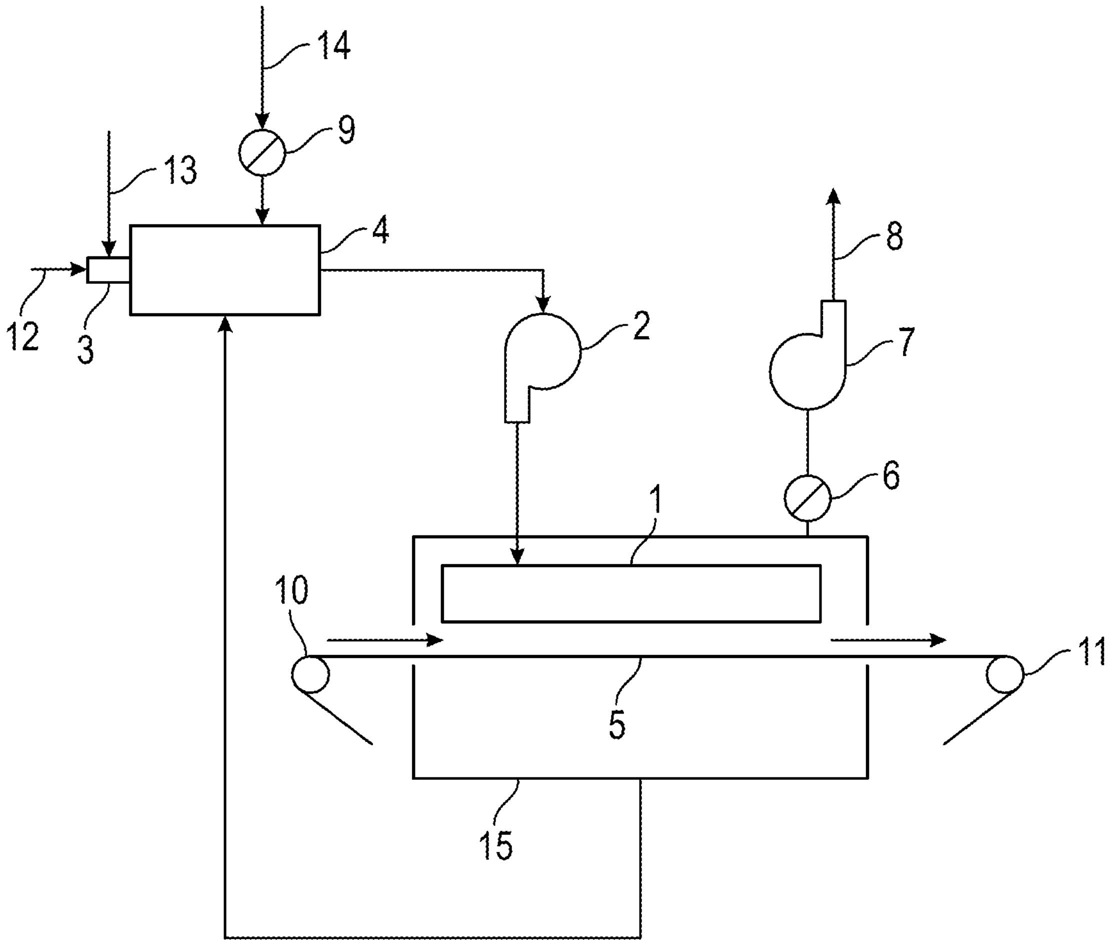
FIG. 1 is a schematic diagram of a typical drying system.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

A major cost in the rapid drying of any product, is the sustainable source and cost of the energy used.

Electrical power is rapidly being considered as a sustainable energy source and is increasingly being generated using wave, wind, solar, hydro and nuclear primary sources. To ensure that optimization of resources, an example embodiment of the disclosed concept creates a hybrid heating system using natural gas and electricity as the source of energy to heat air to a temperature to dry metal beverage cans.

In some example embodiments, an online moisture and temperature measuring system is employed. The electrical signals generated are used to control the moisture level in the drying process, and the amount of energy needed can be measured and controlled. When the amount of energy is well controlled, the prime sources of energy can be optimized to reduce the carbon footprint of this energy intensive operation.

In conventional driers, the use of direct gas fired burners requires a level of fresh air input into the combustion chamber to ensure stoichiometric conditions to ensure optimum combustion. During the combustion process other gases are produced that are harmful to people. To ensure the people are kept safe, the harmful gases are discharged outside the building structure via a stack into the atmosphere, such as is shown in the drying system of FIG. 1. The harmful gases produced by burning natural gas are also harmful to the environment and it is strongly believed that the accumulation of these gases in the upper atmosphere are contributing to global warming.

Figure 2:
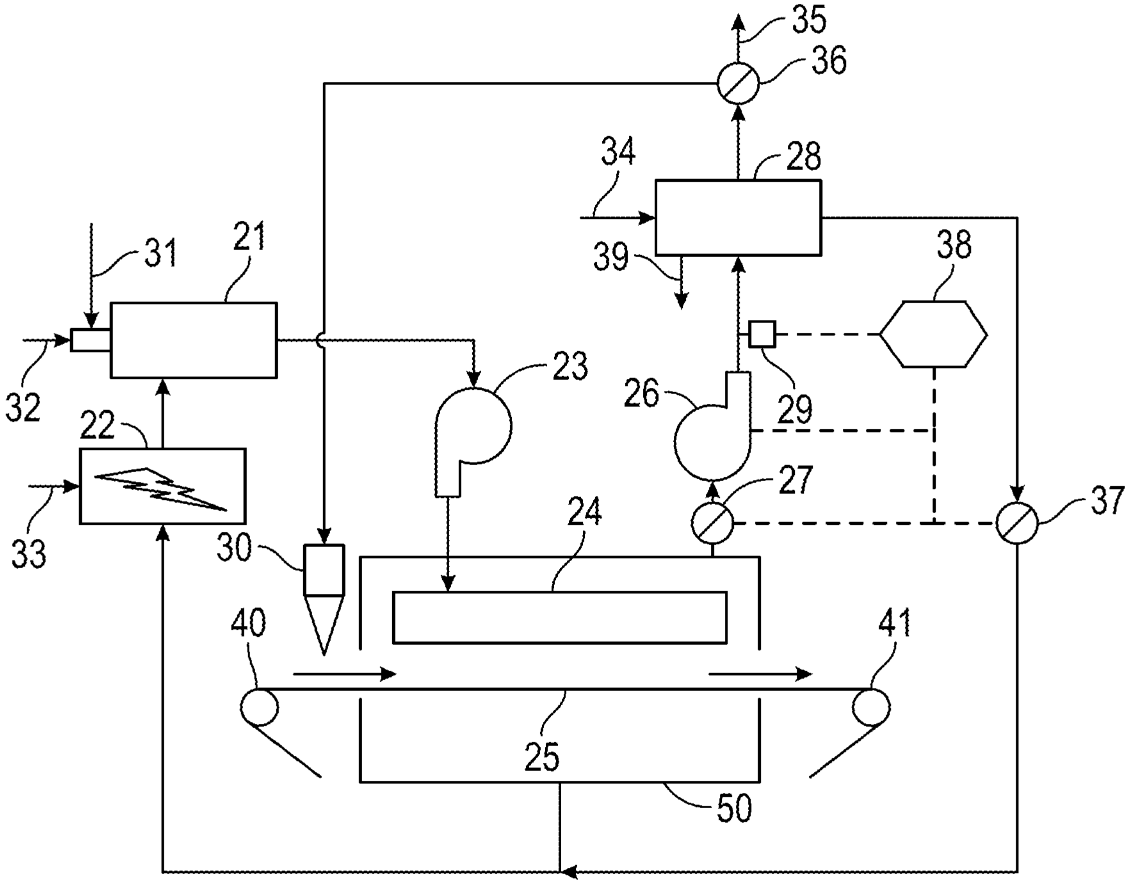
FIG. 2 is a schematic diagram of a drying system in accordance with an example embodiment of the disclosed concept.

FIG. 2 is a schematic diagram of a drying system in accordance with an example embodiment of the disclosed concept. The drying system uses a gas burner 21 and an electrical heating element 22, which can work together to provide a hybrid heating system. The gas burner 21 is fed with combustion air 31 and natural gas 32. The electrical heating element 22 is fed with electrical power 33. Both units, the gas burner 21 and the electrical heating element 22, can be used to raise the temperature of the drying system to the required operating point in a short space of time required. When the drying system is at the desired operating temperature, the gas burner 21 will be switched off and the heating will be maintained with just electrical heating element 22. The gas burner 21 can be used if needed in short bursts to even out any external changes that cannot be accommodated by the electrical heating element 22. A control system 38 may control the gas burner 21 and the electrical heating element 22 to switch between a first mode where the gas burner 21 and the electrical heating element 22 are active and both heat air provided to a plenum chamber 24 (also referred to as a heating chamber) and a second mode where the gas burner 21 is inactive and the electrical heating element 22 is active.

The drying system is designed to use high temperature hot air to evaporate the water film to zero before the cans leave the dryer 50. Cans enter the dryer 50 at an inlet port 40 and are carried through the dryer 50 to an outlet port 41 via a conveyor 25. Hot air is blown onto the cans via centrifugal recirculation fan 23, which blows hot air into the plenum chamber 24 fitted with nozzles, via a series of ducts. The elements that facilitate movement of the air from the gas burner 21 and electrical heating element 22 to the plenum chamber 24 may be referred to as a circulation system (e.g., the centrifugal recirculation fan 24, the ducts, etc.). The hot air provides the energy to raise the temperature of the cans and evaporate the water into a vapor, which is absorbed into the air stream. As the air loses energy due to the heating and vaporizing process, the air is cooled. The cooled air is drawn through the conveyor 25 and ducted past the electrical heating element 22 and the gas burner 21, where it is reheated by one or both of the electrical heating element 22 and the gas burner 21, depending on the current operating status of each. The air is then pulled into the suction side of the centrifugal fan 23 to complete the drying air cycle.

The recirculating hot air passing over the containers will absorb water evaporated from the surface of the containers being dried. Water vapor is absorbed into the hot air. A portion of the hot moist air is drawn from the recirculating air system by a centrifugal exhaust fan 26 via a control damper 27.

The air removed from the recirculating drying air stream will be passed through the condensing heat exchanger 28 via a set of duct work to a diverter damper 36. The position of the diverter damper 36 will be determined by a computer signal which will identify if the gas burner 21 is being used. If the gas burner 21 is being used, the diverter damper 36 will duct the gases to an exhaust stack outside the building to atmosphere 35. If the control system 38 identifies that the gas burner 21 is not being used, the diverter damper 36 will duct the hot moist stream via a set of ducts to a pre-heater plenum chamber 30 (also referred to as a secondary heating chamber).

A humidity sensor 29 may be fitted into the interconnecting duct between the exhaust fan 26 and the condensing heat exchanger 28 to measure temperature and humidity of the air removed from the recirculating air system. The signals from the humidity sensor 29 will be analyzed by the control system 38 and the signals generated will be used to control the amount of hot air removed from the recirculating drying air stream and the amount of fresh, cool, air (which may be referred to as make-up air) 34 added to maintain a pressure balance in the dryer cavity. The make-up air flow will be controlled by the control system 38 with dampers 27,37.

Combining the heating sources into the hybrid dryer using both gas and electricity means that the gas burner 21 size can be reduced, but the warmup time of the dryer is not compromised. The warming up of the dryer system will use both heating sources to provide heat, when the dryer is up to operating temperature the gas burner 21 will switch off leaving the more efficient electrical heating element 22 to power the dryer. It should be noted that using a smaller gas burner 21 means that it will run at its optimum efficiency when it is at high fire. Large gas burners are normally specified to cover all eventualities and then when they are in operation after the warm-up period they modulate down to run at 50% to 60% of the designed capacity, which is not efficient.

The disclosed concept has the advantage that when the gas burner 21 is switched off, the combustion products generated disappear. Using the electrical heating element 22 is considered a clean heat, and therefore protecting the operator from noxious fumes is not needed. The condensing air-to-air heat exchanger 28 pre-warms the cold/dry make-up air prior to it entering the drying cycle using the hot/wet air removed from the drying cycle. Water evaporated off the cans is absorbed into the drying cycle air as vapor. As the temperature of the removed air cools in the heat exchanger 28, the vapor condenses to water 39. Because the liquid water is considered as pure, the water can be reused in the washing process to reduce overall water consumption making the process more efficient in using valuable raw materials.

The operation of the dryer is further improved by installing a humidity control system that measures the amount of water absorbed by the heated air, i.e., relative humidity. The drying concept allows humidity of the air in the dryer system to increase to the highest level possible before the containers stop being dried. By reducing the amount of air removed and therefore reducing the amount of fresh air added, this optimizes the system and ensures that a higher proportion of hot/wet air is discharged rather than hot dry air.

Humidity control reduces the amount of fresh cold air added to the drying cycle by reducing the volume of air removed from the drying cycle. This reduces the amount of cooler make-up air, and thus requires less heating compared to if more cooler make-up air is introduced to the cycle. The air removed from the drying cycle is normally discharged outside the building to the atmosphere when direct gas fired heating is used. To ensure the various pressures inside the dryer are kept in balance, the amount of hot air removed and the amount of cool fresh air added is adjusted to prevent cans being blown over and to ensure fugitive harmful emissions do not escape from the can infeed and outfeed openings. Heat is added to the drying cycle to raise the temperature of the fresh cold air to the required operating temperature before the air is used to raise the temperature of the can and evaporate the water off the surfaces of the cans.

The disclosed concept incorporates the additional optimization of electrical thermal energy by using the warm moist air leaving condensing heat exchanger 28 to pre-heat the incoming wet cans via the pre-heater plenum chamber 30, as a little residual water in the air stream will not affect the dryer operation. Any fugitive air escaping will be considered as a low-grade heat and will not contain harmful combustion products when only electrical heating is used.

An additional feature is that moisture in the wet air removed from the recirculating hot air system by the heat exchanger 28 will condense to liquid water 39 containing no harmful chemicals which will be used to top up the water supply to the washing process.

In some example embodiments of the disclosed concept, the hybrid heating, i.e., electrical and gas burner heating, may be employed in any suitable type of can dryer or oven system, such as a washer dryer, a pin oven, an internal bake oven, or an outside bake oven. For example, while a washer dryer is used to remove only water, a pin oven, an internal bake oven, and an outside bake oven may remove solvent, water, volatile organic compounds, or a mixture of these to leave the various solid elements of the coatings or inks on the can. Once the solids are deposited onto the cans they are cured at a high temperature and fused together, which then seals the solid elements onto the can surfaces to provide a homogenous covering. It will be appreciated that the hybrid heating system of the disclosed concept may be employed with any of these types of dryers or ovens. It will also be appreciated that in some applications, certain elements, such as heat recovery elements, may be omitted or modified without departing from the scope of the disclosed concept.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A heating system for use with a can dryer or oven, the system comprising:

a gas burner;

an electrical heating element;

a heating chamber structured to heat cans using air heated by the gas burner and/or the electrical heating element;

a circulation system structured to move air from the gas burner and the electrical heating element to the heating chamber; and a control system structured to selectively control the gas burner and the electrical heating element to switch between a first mode where the gas burner and the electrical heating element are active and both heat air provided to the heating chamber and in a second mode where the gas burner is inactive and the electrical heating element is active.

2. The heating system of claim 1, further comprising:

a humidity sensor structured to monitor humidity of air in the circulation system, wherein the control system is structured to control the circulation system to introduce new external air to the circulation system when the monitored humidity reaches a predetermined level.

3. The heating system of claim 2, further comprising:

a heat exchanger structured to warm the new external air using air from the heating chamber.

4. The heating system of claim 3, further comprising:

a first damper disposed between the heating chamber and the heat exchanger; and a second damper disposed between the heat exchanger and the gas burner or electrical heating element, wherein the control system is structured to control an amount of air recirculated in the circulation system and an amount of the new external air added to the circulation system via the first and second dampers.

5. The heating system of claim 3, wherein the humidity sensor is disposed between the heating chamber and the heat exchanger.

6. The heating system of claim 3, wherein the heat exchanger is structured to remove moisture from air received from the heating chamber and condense the removed air to water.

7. The heating system of claim 1, further comprising:

a secondary heating chamber structured to pre-heat cans entering the heating chamber.

8. The heating system of claim 7, wherein the control system is structured to selectively exhaust a portion of the air from the heating chamber or direct a portion of the air from the heating chamber to the secondary heating chamber based on whether the gas burner is active.

9. The heating system of claim 8, further comprising:

a diverting damper disposed between the heating chamber and the secondary heating chamber, wherein the control system is structured to control the diverting damper to selectively exhaust a portion of the air from the heating chamber or direct the portion of the air from the heating chamber to the secondary heating chamber based on whether the gas burner is active.

10. The heating system of claim 1, wherein the control system is structured to control the gas burner and the electrical heating element in the first mode when air in the circulation system is below a predetermined temperature and to control the gas burner and electrical heating element in the second mode when air in the circulation system is above the predetermined temperature.

11. The heating system of claim 1, wherein the gas burner is powered by natural gas.

12. The heating system of claim 1, wherein the electrical heating element is powered by electric power.

13. The heating system of claim 1, further comprising:

a conveyor structured to move cans through the heating chamber.

14. A method of heating cans in a can dryer or oven, the method comprising:

providing a gas burner, an electrical heating element, a heating chamber structured to heat cans using air heated by the gas burner and/or the electrical heating element, and a circulation system structured to move air from the gas burner and the electrical heating element to the heating chamber; and selectively controlling the gas burner and the electrical heating element to switch between a first mode where the gas burner and the electrical heating element are active and both heat air provided to the heating chamber and in a second mode where the gas burner is inactive and the electrical heating element is active.

15. The method of claim 14, further comprising:

providing a humidity sensor structured to monitor humidity of air in the circulation system; and controlling the circulation system to introduce new external air to the circulation system when the monitored humidity reaches a predetermined level.

16. The method of claim 15, further comprising:

providing a heat exchanger structured to warm the new external air using air from the heating chamber; and controlling an amount of the new external air added to the circulation system.

17. The method of claim 16, further comprising:

removing moisture from air received from the heating chamber with the heat exchanger; and condensing the removed air to water with the heat exchanger.

18. The method of claim 14, further comprising:

providing a secondary heating chamber structured to pre-heat cans entering the heating chamber; and selectively exhausting a portion of the air from the heating chamber or directing a portion of the air from the heating chamber to the secondary heating chamber based on whether the gas burner is active.

19. The method of claim 14, wherein selectively controlling the gas burner and the electrical heating element to switch between a first mode where the gas burner and the electrical heating element are active and both heat air provided to the heating chamber and in a second mode where the gas burner is inactive and the electrical heating element is active includes controlling the gas burner and the electrical heating element in the first mode when air in the circulation system is below a predetermined temperature and to control the gas burner and electrical heating element in the second mode when air in the circulation system is above the predetermined temperature.

* * * * *